United States Patent [19]

Horsman

[11] 4,078,632
[45] Mar. 14, 1978

[54] LAND SEISMIC GAS DETONATOR

[75] Inventor: William W. Horsman, Houston, Tex.

[73] Assignee: Michael P. Breston, Houston, Tex.

[21] Appl. No.: 739,673

[22] Filed: Nov. 8, 1976

[51] Int. Cl.² ............................................. B60V 1/00
[52] U.S. Cl. ................................. 181/117; 181/114; 181/119
[58] Field of Search ............... 181/117, 119, 120, 118, 181/114

[56] References Cited

U.S. PATENT DOCUMENTS

| 3,235,027 | 2/1966 | Kilmer | 181/117 |
|---|---|---|---|
| 3,260,327 | 7/1966 | McCollum | 181/117 |
| 3,361,226 | 1/1968 | Szasz | 181/117 |
| 3,401,769 | 9/1968 | Kilmer | 181/117 |
| 3,746,120 | 7/1973 | Kilmer | 181/117 |

Primary Examiner—S. C. Buczinski
Attorney, Agent, or Firm—Michael P. Breston

[57] ABSTRACT

The gas detonator is especially adapted for shallow, seismographic, land prospecting. It comprises a circular bottom plate having an inwardly-directed sloping side wall. An annular top plate is mounted over the bottom plate. Means, including a plurality of springs, interconnect and resiliently maintain the plates in touching relation with each other. A housing is mounted over the top plate and forms therewith a detonation chamber. The bore of the top plate serves as the vent port for the detonation chamber. The vent port is normally closed by the bottom plate. Following the detonation of a combustible gas mixture in the chamber, the plates momentarily separate and form therebetween a cylindrical cavity which opens the vent port. A container upwardly extends from and forms with the bottom plate a reservoir which, in use, is filled with water. The spent gases of combustion escape into this water, thereby muffling the sound of the detonator. The water also adds mass to the bottom plate, thereby improving the coupling thereof with the underlying ground. The bottom plate's sloping side wall improves the coupling efficiency between the bottom plate and an irregular underlying earth pattern as compared to a bottom plate having a non-sloping side wall.

3 Claims, 4 Drawing Figures

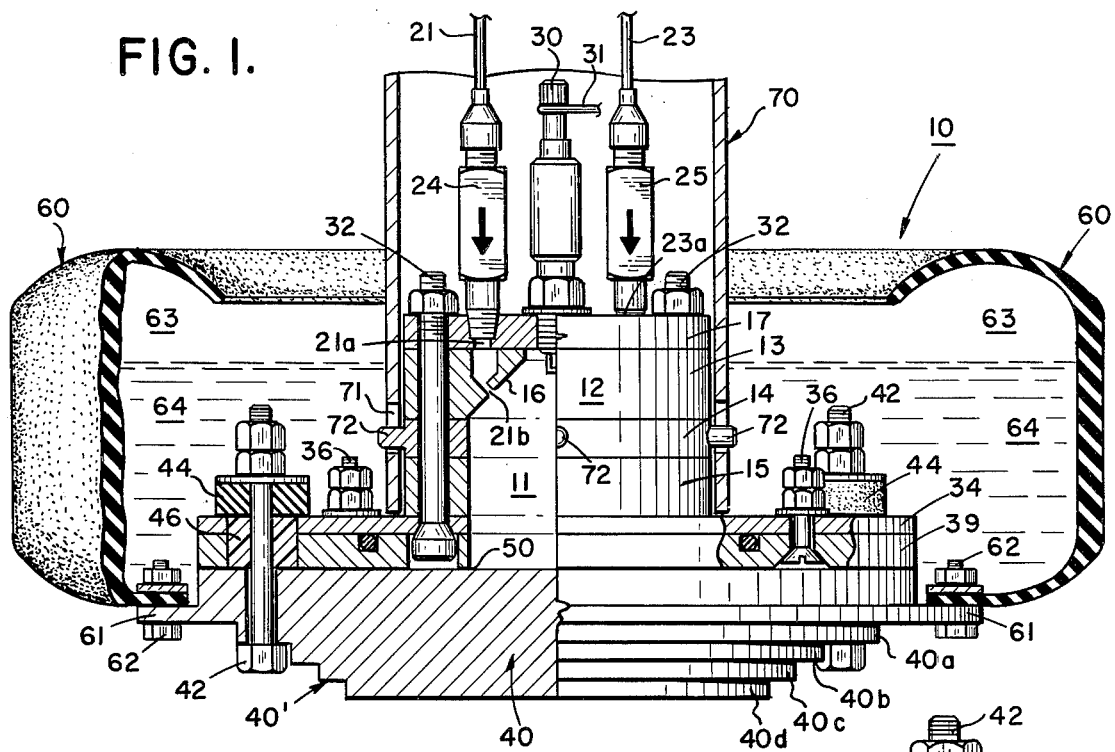
FIG. 1.
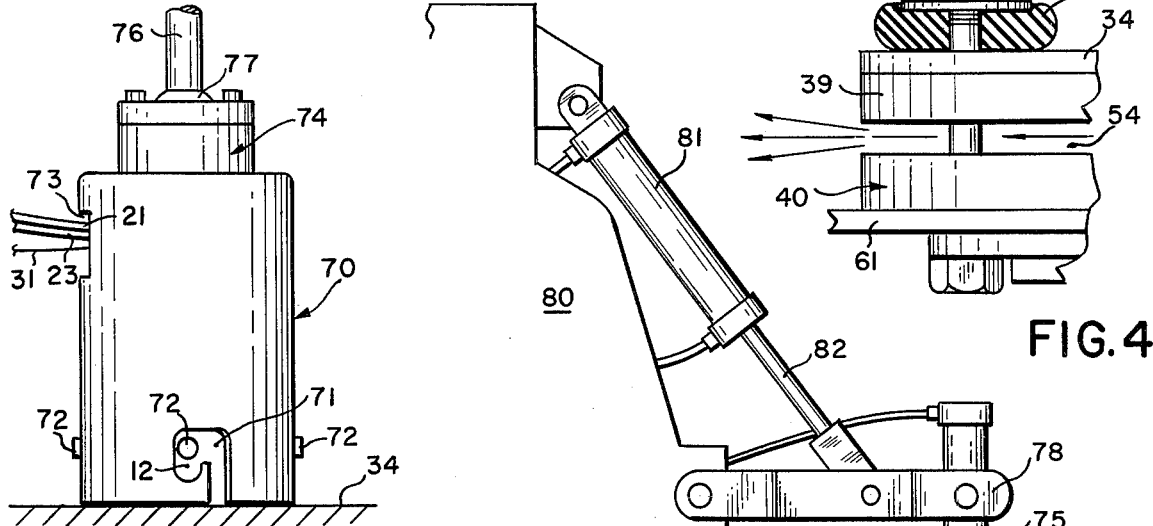
FIG. 2.
FIG. 3.
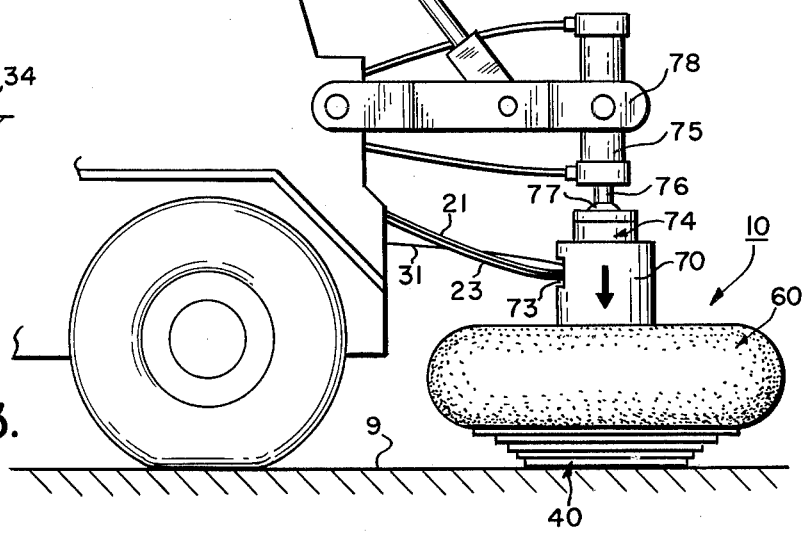
FIG. 4.

LAND SEISMIC GAS DETONATOR

REFERENCE TO RELATED APPLICATION

This application is related to co-pending patent application Ser. No. 574,740, filed on May 5, 1975, now U.S. Pat. No. 4,043,420, for a High Frequency Gas Detonator of which the present applicant is a co-inventor.

BACKGROUND OF THE INVENTION

Seismic energy sources can roughly be classified into sources that produce high-energy, low-frequency (say 2 to 30 Hz) acoustic pulses, and those that produce low-energy, high-frequency (say 600 to 7000 Hz) acoustic pulses. Since the earth attenuates high-frequency signals, only low-frequency sources are used for deep-penetration, low-resolution seismic work. The high-frequency souces are used for shallow-penetration, high-resolution seismic work.

Various low-frequency seismic sources using gas exploders have been proposed in the literature, and several such gas exploders have been successfully employed commercially. Perhaps the most widely used gas exploder is of the type described in U.S. Pat. No. 3,235,027 of L. G. Kilmer. This patent and several others of Kilmer describe a well-known DYNOSEIS[R] gun. Also of interest is U. S. Pat. No. 3,361,226 which shows a pair of plates defining a permanent chamber therebetween. The chamber is normally closed by an imperfect side wall seal which opens upon the separation of the plates.

Kilmer's commercially-employed gas exploder essentially comprises a rigid top plate positioned over a rigid bottom plate. A vertical, extensible sidewall between the top and bottom plates enclose a detonation chamber therebetween. The chamber accepts a combustible gas mixture which is periodically ignited. The energy of combustion strikes the bottom plate and extends the side wall. The bottom plate moves relative to the top plate and transmits an acoustic signal into the earth. The gas products of combustion are vented from the combustion chamber by an upwardly-extending exhaust line.

It was found that the known gas detonators having a cylindrical bottom plate are rather inefficient for use over uneven terrains.

Also, for high-resolution seismic profiling, used in shallow seismic work, known commercial acoustic energy sources use transducers for converting electric energy into acoustic energy. Unfortunately, the efficiency of such electrically-operated transducers is very low, on the order of 1% or less. This is so because the primary fuel is typically used to first power a diesel engine that drives an AC alternator whose output is converted into DC energy, which is in turn converted by the transducer to acoustic energy. Thus, even a portable, electrically-operated transducer requires bulky and heavy auxiliary equipments which make the overall system inefficient and limited for special applications. The main advantage of such electric transducers is that they can be operated at high repetition rates.

Accordingly, it is an important object of the present invention to provide an efficient, high-frequency, land seismic energy source which is especially adapted for working over uneven and rough terrains.

It is a further object of this invention to provide a gas exploder of the type described in said co-pending applicaton, but whose bottom plate's side wall tapers for the purpose of focusing the transmitted energy into the ground.

To obtain a relatively-high repetition rate, it is essential that the spent gases be flushed out from the combustion chamber as fast as possible, yet without creating acoustic noise that might interfere with the detected reflected seismic signals.

In accordance with another aspect of this invention, the gaseous products of combustion are vented from the detonator into a reservoir filled with liquid, such as water. The mass of the water adds to the mass of the bottom plate for better coupling with the ground, and the water muffles the exhaust gases.

SUMMARY OF THE INVENTION

In a preferred embodiment, the detonator of this invention comprises a rigid, circular, bottom plate having a sloping side wall. A rigid, annular top plate is positioned over the bottom plate in touching relation with each other over their entire opposed, planar surfaces. A housing is mounted over and forms with the top plate a detonation chamber. The bore of the top plate serves as the vent port for the detonation chamber. The vent port is normally closed by the bottom plate. Means, including a plurality of springs, resiliently urge the plates toward each other. Gas supply means controllably feed a combustible gas mixture into the detonation chamber. Ignition means periodically detonate the combustible gas mixture in the chamber. Following each detonation, the plates move away from each other, thereby establishing a cylindrical cavity therebetween which communicates the vent port with the ambient medium surrounding the detonator. Following the detonation in the chamber, the springs re-establish contact between the opposite, planar surfaces of the plates, thereby effectively closing the vent port of the detonation chamber.

A container upwardly extends from and forms with the bottom plate a reservoir which, in use, is filled with water. The spent gases of combustion escape, from the vent port through the momentary cavity formed between the plates, into the water body thereby muffling the sound of the detonator. Also, when the mass of the water is added to the mass of the bottom plate, improved coupling efficiency between the bottom plate and an irregular underlying earth pattern is achieved.

The improvement of this invention over the detonator described in said co-pending patent application, lies primarily in the provision of a sloping side wall to the bottom plate, and in the coupling of a liquid reservoir to the bottom plate around the detonator.

BRIEF DESCRIPTION OF THE DRAWINGS

FIG. 1 is a partial view in elevation, partly in section, of the gas detonator of this invention;

FIG. 2 is a view in elevation of the detonator showing the support housing for the detonator;

FIG. 3 shows the detonator housing attached to the rear end of a seismic truck; and FIG. 4 is a fragmentary, enlarged view of the plates illustrating the formation of a cavity between the flat surfaces of the plates following a detonation.

DESCRIPTION OF A PREFERRED EMBODIMENT

Referring to the drawings, there is shown a preferred construction of the detonator of the present invention, generally designated as 10, for generating into the ground a series of acoustic pulses. The detonator includes a detonation chamber 11 formed inside a housing, generally designated as 12. Housing 12 is preferably of cylindrical construction and is made up from one or more annular sections. Three such sections 13-15 are illustrated in the drawings. The volume of chamber 11 determines the amplitude and frequency of the acoustic pulses produced by detonator 10. Sections 13-15 have equal external diameters. Sections 14, 15 have the same internal diameters, and section 13 is provided internally with a conical surface 16 which improves the velocity propagation characteristics of chamber 11. A solid cylindrical cover 17 closes the top end of chamber 11.

An oxidizer gas is supplied to an input line 21, and a combustible gas is supplied to an input line 23. Input line 21 is coupled to an inlet 21a, and input line 23 is coupled to an inlet 23a in cover 17. Lines 21 and 23, respectively, include check valves 24, 25 to prevent the detonation flames from becoming transmitted to the gas sources. Inlet 21a communicates with a small-diameter bore 21b in wall 16. Inlet 23a is similarly coupled to chamber 11 through a small diameter bore (not shown). The function of each such bore is to effectively stop the detonation shock waves from becoming transmitted upstream to its assocated check valve 24 or 25.

A spark plug 30 in top cover 17 receives an electric pulse on an ignition line 31. The electrodes of the spark plugs are exposed to the internal volume of the detonation chamber 11.

Housing 12 is held together by a plurality of bolts 32 extending through an annular flange 34. An annular top plate 39 is secured to flange 34 by a configuration, plurality of circumferentially-arranged bolts 36. A bore 50 in annular plate 39 is concentric with and has the same diameter as the bore of chamber 11. Hence, the volume of the detonation chamber 11 is determined by the bores in annular sections 13-15 and by bore 50 of the annular top plate 39. Bore 50 serves as the vent port for chamber 11.

A rigid, solid bottom plate 40 is secured to plate 39 by a plurality of circumferentially-arranged bolts 42 having springs 44 mounted thereon. Springs 44 are preferably made of rubber, although other suitable materials could also be used. Each bolt 42 passes through a sleeve bearing 46 extending through the thickness of plate 39. Bottom plate 40 has an inwardly-directed sloping side wall, generally designated as 40a which can be of conical configuraton. However, for ease of manufacturing, wall 40a is made up of steps which form a plurality of consecutively smaller-diameter cylindrical walls 40a-–40d. Thus, wall 40a tapers inwardly from the top face to the bottom face of plate 40. The angle of taper will depend on the irregularity pattern of the underlying earth, the greater the irregularity, the greater the taper.

I have unexpectedly discovered that for uneven ground, the sloping wall 40a improved the transfer of energy from plte 40 to ground 9. As a result, significantly sharper reflected seismic signals could be detected.

An upwardly-extending container 60, which can be made from a car tire, is coupled in a water-tight fashion by bolts 62 to an annular flange 61 extending from bottom plte 40. Flange 61 together with container 60 from a reservoir 63 of sufficient volume capacity to nearly completely submerge, when filled with water 64, the detonator 10. Thus, the wall of container 60 being made of a flexible material further improves the muffling effect of the water on the exhaust gases.

To lift detonator 10 and to apply a downwardly-exerted force thereon, when on the ground 9, there is provided a housing 70 having a plurality of J-slots 71 adapted to receive and lock in a plurality of lugs 72 radially and outwardly extending from plate 40. The clearances and dimensions of the J-slots are such tha sleeve 70 can apply a downward force on plate 40 without engaging lugs 72. A side window 73 in housing 70 allows lines 21, 23 and 31 to extend outwardly for connection to auxiliary supply equipment on a seismic truck 80 (FIG. 3).

Extending from housing 70 is an upper sleeve 74 (FIGS. 2 and 3) which contains a spherical socket adapted to rotatably receive a ball 77 which is secured to the end of a rod 76 which is hydraulically-operated by a cylinder 75. Cylinder 75 is maintained upright by a lateral support 78 that is pivotally supported by a rod 82 that is hydraulically operated by an inclined cylinder 81 pivotally secured to truck 80. Thus, support 78 and hence detonator 10 can be pivoted about the rear end of truck 80 by rod 82 of cylinder 81.

In operation, to fire detonator 10, a trigger pulse is supplied to spark plug 30 which detonates the previously admitted gas mixture inside detonation chamber 11. The resulting detonation shock wave moves down from taper wall 16 to vent port 50. The shock wave strikes bottom plate 40, causing it to momentarily separate from top plate 39 (FIG. 4) and to compress springs 44 because the pressure inside detonation chamber 11 becomes considerably greater than the total pressure supplied by the springs. The momentary separation of plates 39, 40 results in the formation of a cylindrical cavity 54 between the normally-touching opposite surfaces of th plates. Cavity 54 opens detonation chamber 11 to the body of water 64 surrounding the detonator. The water effectively muffles the exhaust gases thereby substantially completely reducing the noise which would have been generated by the spent gases. The detected reflected seismic signals will therefore have a better signal-to-noise ratio. When the pressure in the detonation chamber again falls to approximately the pressure supplied by springs 44, the momentary cylindrical cavity 54 will completely collapse upon the reengagement of the opposite surfaces of the plates 39, 40. Thus, except during the separation of plates 39, 40 due to the energy produced by the detonation, no cavity 54 is formed between the plates.

A very fast repetition rate can be achieved with the detonator 10 of this invention. The amplitude and the frequency of the downward acoustic pulse produced by detonator 10 can be varied by varying the diameter of plates 39, 40, the length of housing 12, the volume of detonation chamber 11, and the oxygen-to-fuel ratio.

What is claimed is:

1. In a land gas detonator for conducting seismographic work over the earth, said detonator comprising: a bottom plate adapted to be coupled to the earth, an annular top plate having a center bore; spring means for interconnecting and resiliently maintaining the opposite surfaces of the plates in touching relationship with each other; a housing mounted over said top plate and forming therewith a detonation chamber, said top plate's bore being normally closed by said bottom plate; means admitting a charge of a detonating gas mixture into said chamber; ignition means for igniting said gas mixture, thereby causing a momentary separation of and the formation of a cylindrical cavity between the plates, said cavity communicating with said chamber through said bore, the improvement wherein:

said bottom plate has an inwardly-directed slope for increasing the coupling efficiency between the bottom plate and an irregular underlying earth pattern.

2. The detonator of claim 1, and a wall upwardly-extending from said bottom plate and forming therewith a liquid reservoir of sufficient volume to fully submerge said plates, and said liquid muffling the spent gases exhausted through said cavity, and adding mass to the bottom plate for improved coupling by the bottom plate with the underlying earth.

3. The detonator of claim 2, wherein said upwardly-extending wall is made of a flexible material, thereby increasing the muffling characteristics of said liquid.

* * * * *